Aug. 11, 1964  N. H. VOGT ETAL  3,144,062
MACHINE FOR SEVERING END PORTIONS FROM ANIMAL CARCASSES
Filed Aug. 2, 1961  3 Sheets-Sheet 1

INVENTORS.
NORMAN H. VOGT
HARRY W. WEPRIN
SAMUEL P. PASUTIN
By Carl C. Batz
ATT'Y Aug. 11, 1964    N. H. VOGT ETAL    3,144,062
MACHINE FOR SEVERING END PORTIONS FROM ANIMAL CARCASSES
Filed Aug. 2, 1961                                    3 Sheets-Sheet 2
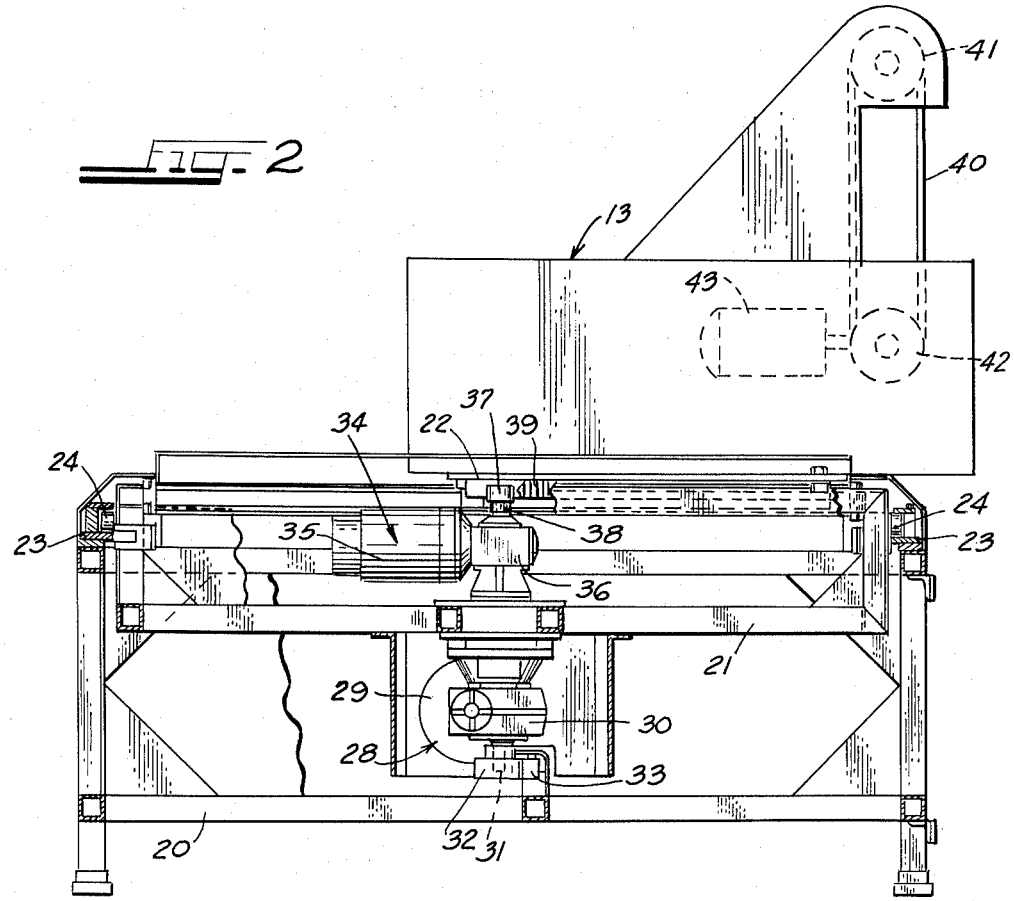
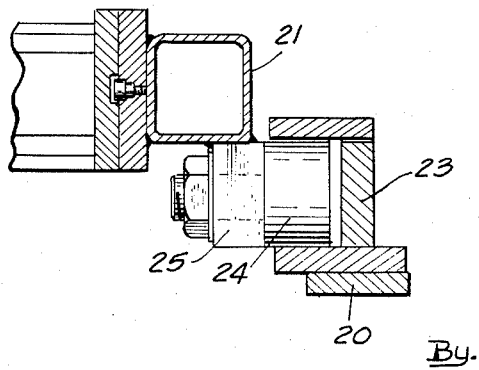
INVENTORS.
NORMAN H. VOGT
HARRY W. WEPRIN
SAMUEL P. PASUTIN
Carl C. Batz Aug. 11, 1964   N. H. VOGT ETAL   3,144,062
MACHINE FOR SEVERING END PORTIONS FROM ANIMAL CARCASSES
Filed Aug. 2, 1961   3 Sheets-Sheet 3
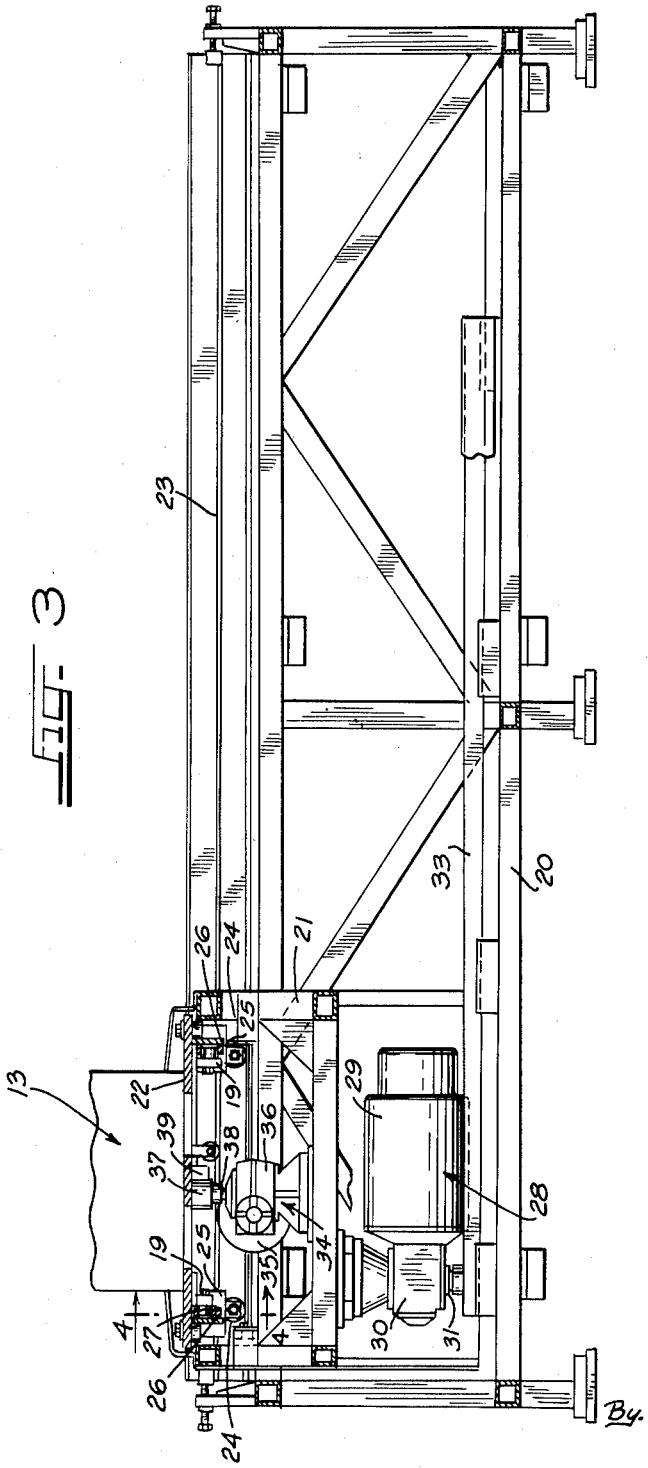
INVENTORS.
NORMAN H. VOGT
HARRY W. WEPRIN
SAMUEL P. PASUTIN
By. Carl C. Betz
ATT'Y

United States Patent Office 3,144,062
Patented Aug. 11, 1964

3,144,062
MACHINE FOR SEVERING END PORTIONS
FROM ANIMAL CARCASSES
Norman H. Vogt, Clawson, Mich., Harry W. Weprin, Chicago, Ill., and Samuel Pasutin, Royal Oak, Mich., assignors to Armour and Company, Chicago, Ill., a corporation of Delaware
Filed Aug. 2, 1961, Ser. No. 128,733
4 Claims. (Cl. 146—81)

This invention relates to means for severing end portions from an elongated mass, and it particularly relates to means for severing end portions from an animal carcass. For purposes of description the invention herein described relates to the removal of shoulder portions from a hog carcass.

An object of this invention is to provide novel means for removing an end portion from an elongated mass.

It is another object of this invention to provide means for removing shoulder portions from animal carcasses.

It is still another object of this invention to provide apparatus wherein shoulder portions of animal carcass halves are removed consecutively in a single continuous movement.

It is also an object of this invention to provide apparatus for moving carcass severing means in a generally rectangular path of travel.

It is a further object of this invention to provide a machine wherein carcass severing apparatus is initially positioned away from the cutting path of travel, and then is positioned for the cutting operation, carried along the cutting path of travel, retracted from the cutting path of travel, and returned to the initial position.

Furter purposes and objects of the present invention will appear as the specification proceeds.

One embodiment of the present invention is illustrated in the accompanying drawings, wherein:

FIG. 2 is a partially broken away, end elevation view of the shoulder cutting means;

FIG. 3 is a partially broken, side elevational view of the shoulder cutting apparatus; and FIG. 4 is an enlarged sectional view taken along line 4—4 of FIG. 3.

Figure 1:
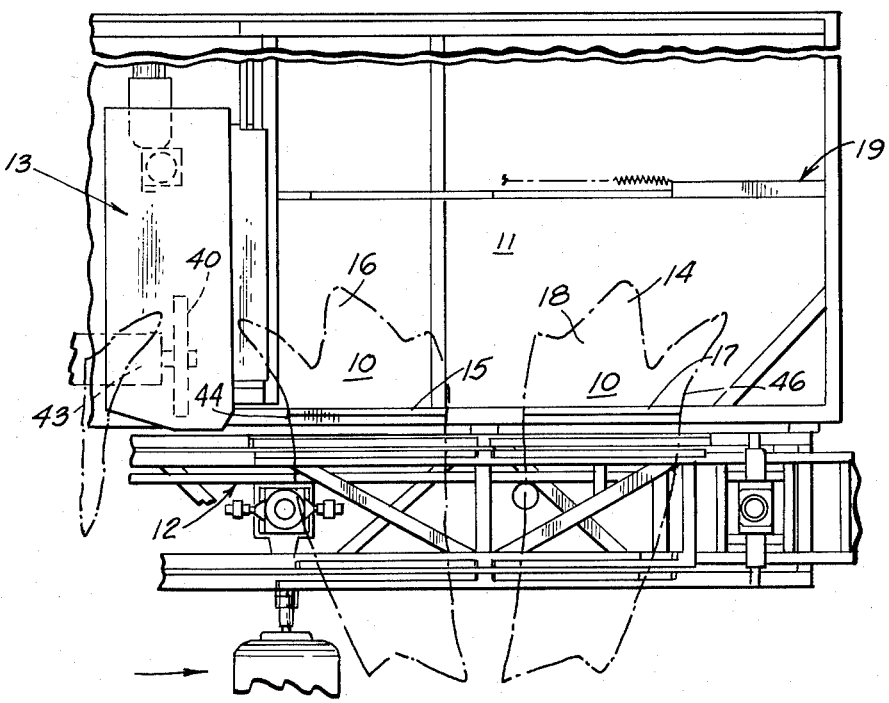
FIG. 1 is a top plan view of the shoulder cut-off apparatus.

Although the description of the present embodiment relates to the removal of shoulder portions from hog carcass halves, it is to be understood that it may be used for many other purposes. The shoulder cut-off apparatus to be described may be utilized in the carcass break-up apparatus described in our co-pending applications Serial No. 77,121, filed December 20, 1960, and Serial No. 110,076, filed May 15, 1961. Although the present apparatus may be used as a unitary machine, for maximum utilization, it is preferred that it be used with an automated system.

Referring to FIG. 1, hog carcass halves 10 are in position at the shoulder cut-off station, generally 11, ordinarily skin-side down on the transfer mechanism, generally 12. Although any type of transfer mechanism could be used in connection with the shoulder cutting operation, the automatic conveyor mechanism described in our co-pending application Serial No. 110,076 is preferred.

The shoulder cutting apparatus 13 may be moved in either direction for the removal of both shoulder portions. We prefer, however, that the movement of the cutting apparatus 13 for the cutting operation be in the direction indicated by the arrow in FIG. 1 and in the same direction as the flow of the carcasses 10. The first shoulder cut 15 severs the shoulder portion 16 from the remainder of the carcass half 10 and the second shoulder cut 17, which is aligned with cut 15, severs shoulder portion 18 from the remainder of the carcass half 10. Shoulder portions 16 and 18 are severed consecutively by a single continuous movement of the cutting apparatus 13.

The present apparatus includes means for supporting a mass, cutting means, and means for moving the cutting means through a desired path in the mass.

Referring to FIGS. 2 and 3, means for controlling the movement of the cutting apparatus 13 through the elongated mass or carcass 10 includes a base or frame 20, a first carriage 21 which is movably supported on frame 20, and a second moving carriage or plate 22 which is movably supported on first carriage 21.

Longitudinal tracks 23 are provided on frame 20 and guide the rollers 24, which are rotatably secured to first carriage 21 by supports 25. Tracks 26 are secured to first carriage 21 and are positioned transverse to tracks 23. Tracks 26 guide the rollers 27 which are rotatably secured to the underside of moving plate 22 by supports 19.

Secured to the underside of frame 20 is longitudinal drive means, generally 28, which includes motor 29 and right angle gear drive unit 30. Secured to shaft 31 of drive unit 30 is spur gear 32 which meshes with gear rack 33 on base 20. Fastened to the upperside of carriage 21 is transverse drive means, generally 34, which includes motor 35 and right angle gear drive unit 36. Spur gear 37 is secured to shaft 38 of drive 36, and meshes with gear rack 39 which is secured to the underside of moving plate 22.

Fastened on the upperside of moving plate 22 is the cutting apparatus 13 which includes cutting means or band saw blade 40. Blade 40 is driven by contact wheels 41 and 42. Wheel 42 is driven by drive means or motor 43.

In operation, carcass halves 10 are transferred to the shoulder cut-off station 11, in such a position that each half 10 is in proper cutting alignment on the transfer mechanism 12 for the saw blade or cutting means 40 to properly sever shoulder portions 16 and 18 along shoulder cut lines 15 and 17. The carcasses 10 are positioned beyond the initial position of blade 40, so that the blade 40 starts to cut the rear or trailing edge 44 of one half 10 and completes the cut through the leading edge or front portion 46 of the second half of the carcass 10.

After the carcasses 10 are properly positioned, transverse drive motor 35 starts and rotates spur gear 37 which meshes with gear rack 39 on plate 22. This causes plate 22 to be moved to proper cutting position since rollers 27 are guided along tracks 26, causing plate 22 and cutting apparatus 13 to be moved transverse to the flow of the carcass 10. When blade 40 reaches the proper cutting position, a limit switch (not shown) is contacted, de-energizing motor 35 and energizing a relay (not shown) which starts motor 29. Motor 28 rotates spur gear 32, which meshes with rack 33 on base 20. This causes frame 21 to be moved relative to the base 20. Rollers 24 are guided by tracks 23 on frame 20. Also, the cutting apparatus 13 is moved longitudinally, so that cuts 15 and 17 are made on carcass halves 10 by blade or cutting means 40 passing therethrough. Motor 29 continues to operate until a limit switch (not shown) is energized, after cuts 15 and 17 have been made. This switch de-energizes motor 29 and energizes the reverse circuit of motor 35, causing plate 22 and apparatus 13 to be retracted from the cutting path of travel. Motor 35 continues operating until a third limit switch (not shown) is energized, stopping motor 35 and starting the reverse circuit of motor 29, driving blade 40 to the initial or starting position ready for another cycle of operation.

It can be seen from the above description that the cutting blade 40 moves in a generally rectangular path and so arranged that the cutting stroke is in the direction of flow of carcasses 10. The rectangular path includes the positioning stroke, the cutting stroke, the retracting stroke, and the return stroke. The shoulder or terminal portions 16 and 18 are removed consecutively, by a single continuous movement of the cutting apparatus 13 which includes cutting means 40, along a desired path of travel. An important advantage is that the cutting movement is independent of the movement of the conveyor. Further, since the saw makes only one pas in the cutting zone, there is a minimum of time in the cutting operation. The conveyor can be speeded up greatly without interfering with the proper speed for the cutting of the meat and bone in the shoulder area, and consequently there is a substantial increase in the capacity and output of the machine, while at the same time the selected desired speed for the cutting operation can be employed in the single pass made by the saw in the cutting zone.

While in the foregoing specification we have described the apparatus of procedure in considerable detail for the purpose of illustrating a specific embodiment of the invention, it will be understood that such details of structure and procedure may be varied widely by those skilled in the art, without departing from the spirit and scope of the invention.

We claim:

1. In apparatus for severing end portions from an elongated mass, conveyor means for supporting said mass, power-operated cutting means for severing end portions of said mass, and means for moving said cutting means in a generally horizontal and rectangular path of travel having a portion thereof extending laterally of said conveyor means and in which the cutting operation is performed in the direction of movement of said mass and in a single line of said rectangular path adjacent said conveyor means.

2. In apparatus for severing shoulder portions from an animal carcass, means for supporting animal carcass halves in side-by-side relationship transversely of said means, power-driven shoulder severing means, means for moving said severing means in a single longitudinal path to sever shoulder portions from said carcass halves and for retracting said severing means laterally in a horizontal plane from said path and rearwardly and then laterally toward said path to the starting position.

3. In apparatus for removing end portions from an elongated mass, conveyor means for advancing said mass, power driven cutting means, a carriage carrying said cutting means, means for advancing said carriage in a path in the direction of movement of said conveyor means and for severing end portions of said mass, and means for moving said carriage laterally in a horizontal plane away from said path and then rearwardly and inwardly to said first-mentioned path of travel.

4. In apparatus for removing end portions from an elongated mass, means for supporting said mass, power-operated cutting means, a carriage carrying said cutting means, a moving frame carrying said carriage for travel in one direction, a base carrying said moving frame for horizontal travel in a direction transverse to the direction of travel of said carriage, means for driving said frame along a path of travel for severing said end portions, and means for driving said carriage towards and away from said path of travel.

References Cited in the file of this patent

UNITED STATES PATENTS

| | | |
|---|---|---|
| 1,447,091 | Lansing | Feb. 27, 1923 |
| 1,747,461 | Vaughan | Feb. 18, 1930 |
| 1,750,223 | Grant et al. | Mar. 11, 1930 |
| 1,809,764 | Trunz | June 9, 1931 |
| 1,817,678 | Dunseth | Aug. 4, 1931 |
| 1,825,205 | Reynoldson | Sept. 29, 1931 |